UNITED STATES PATENT OFFICE.

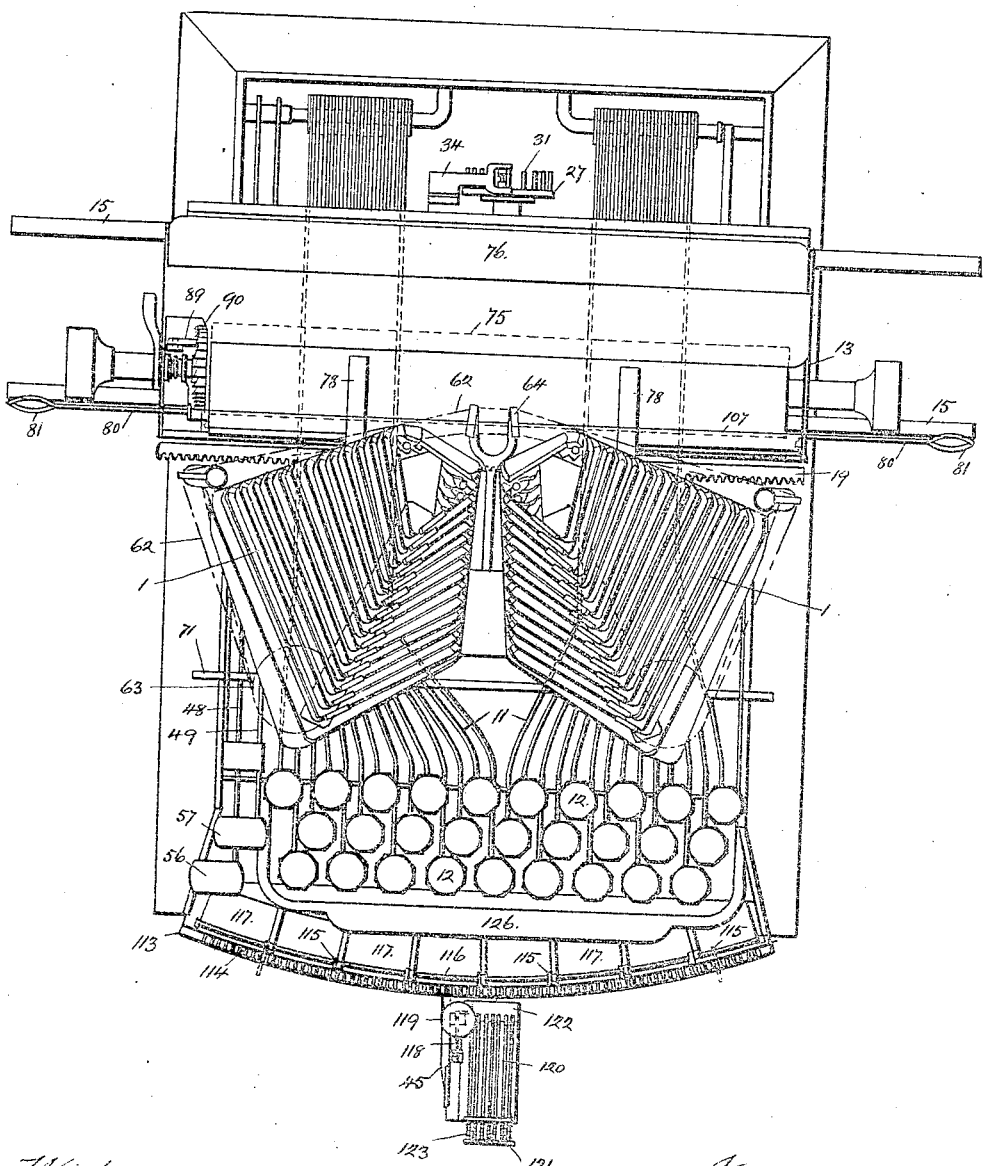

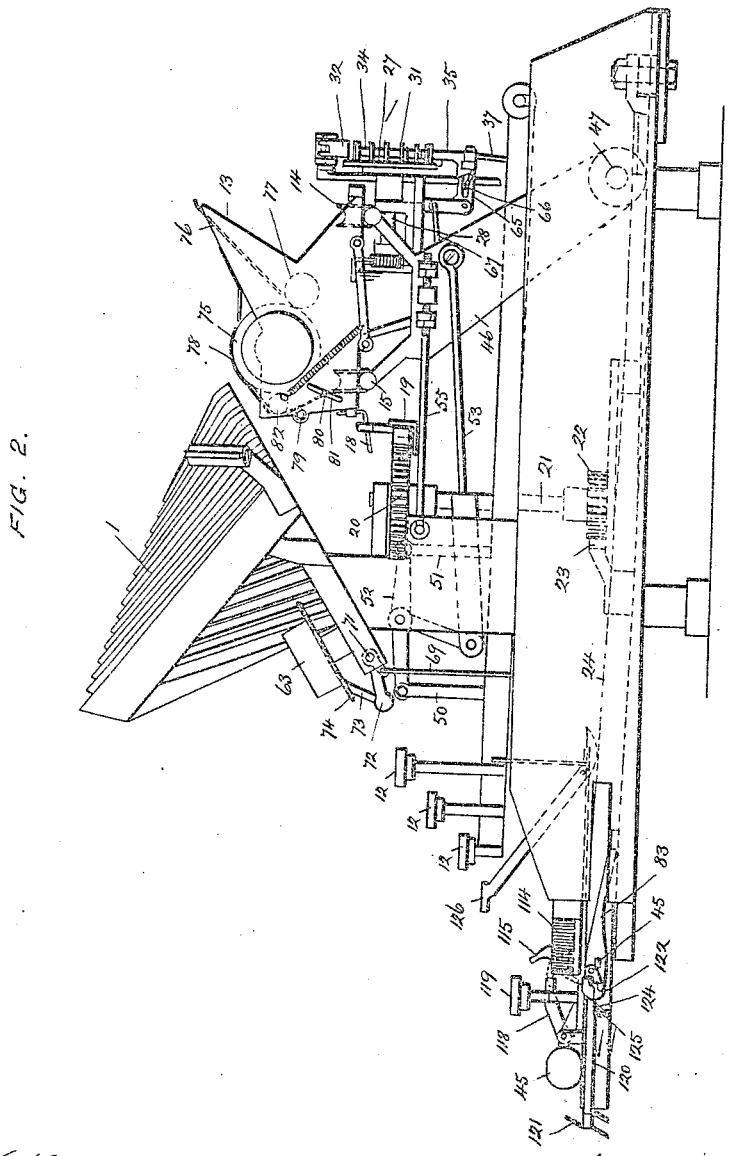

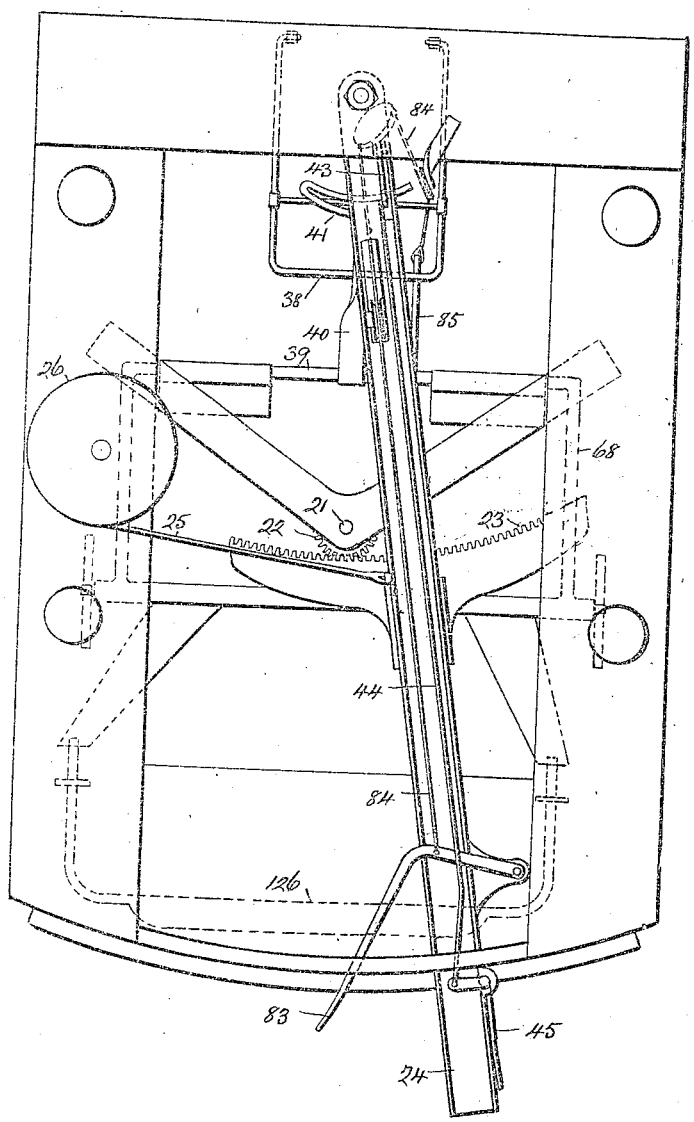

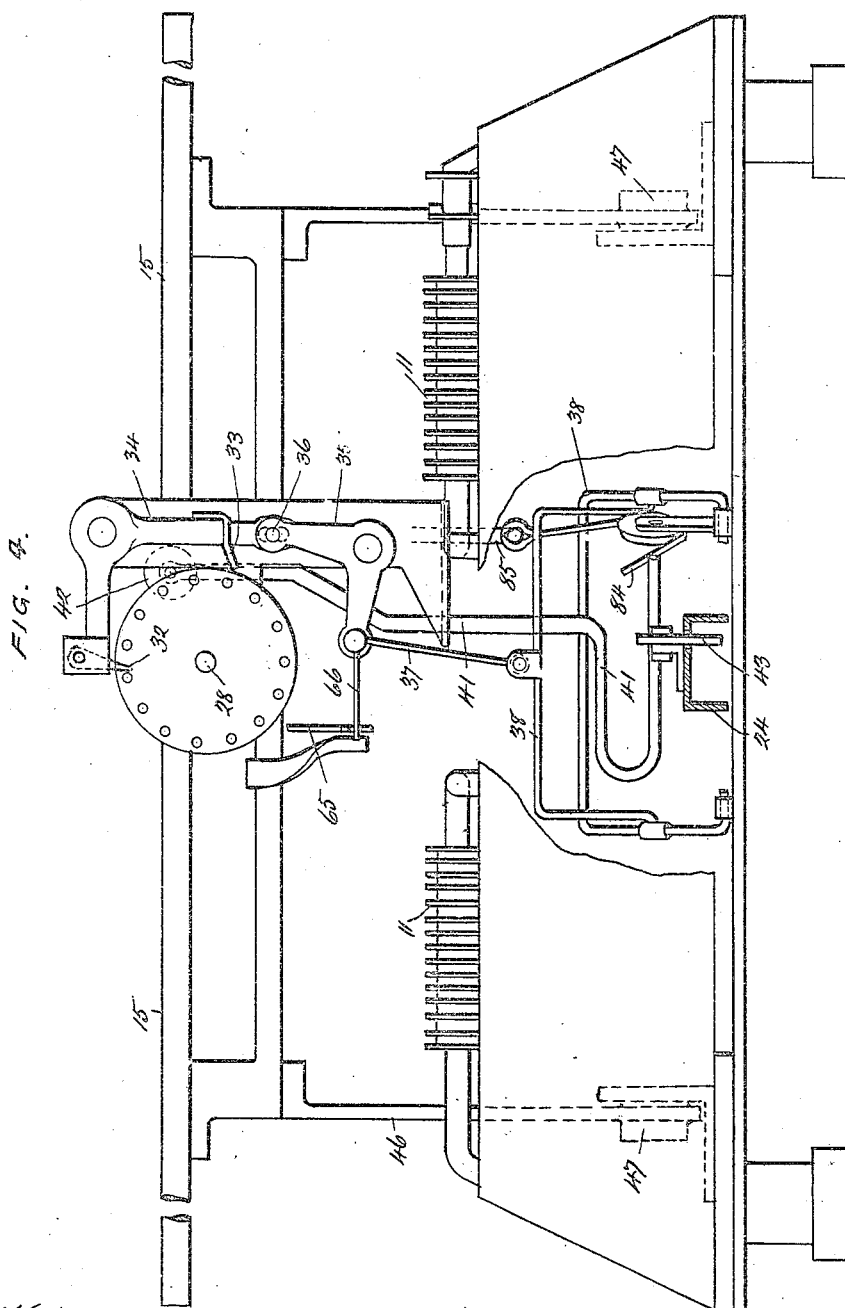

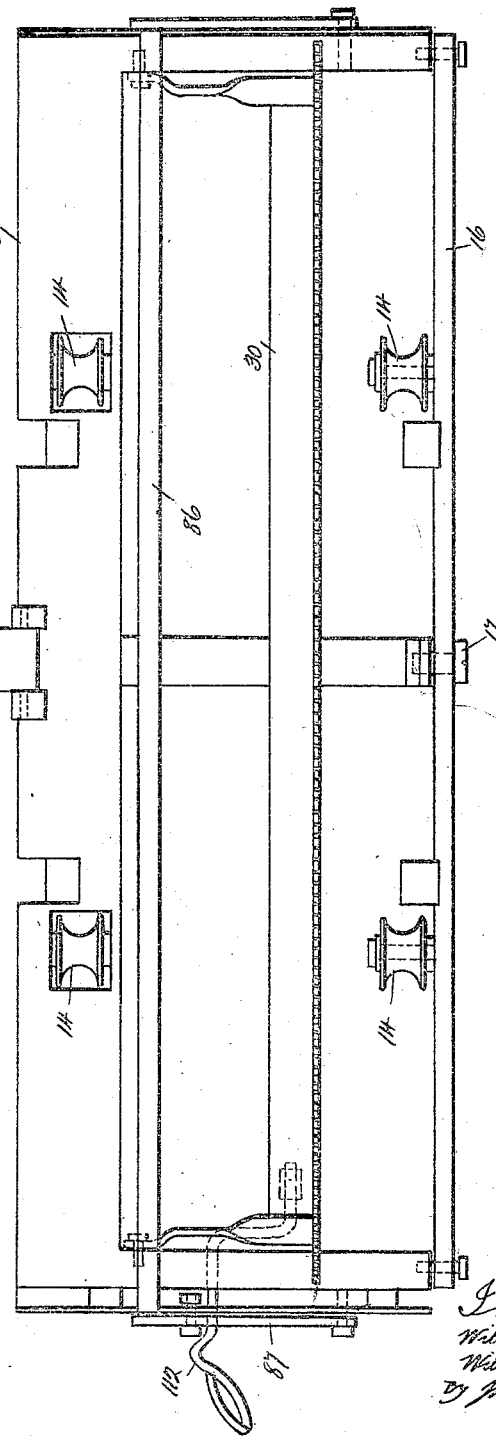

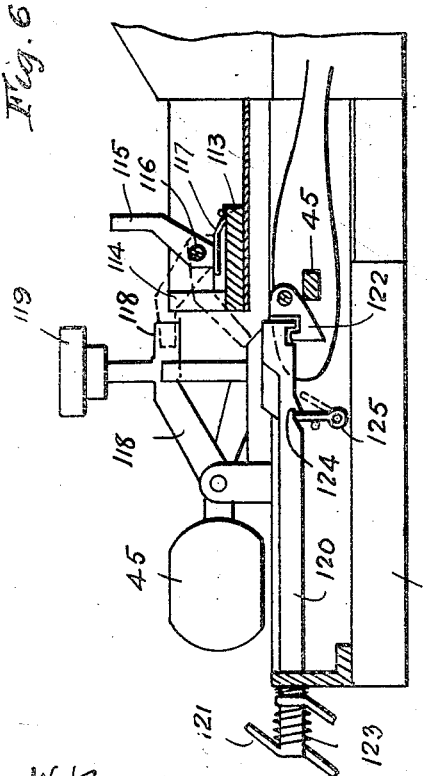
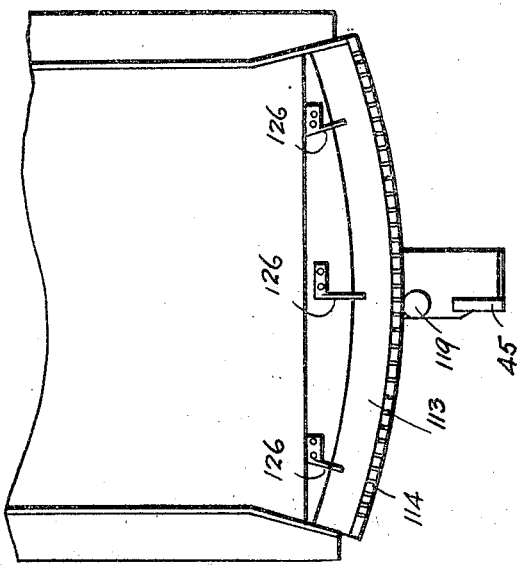
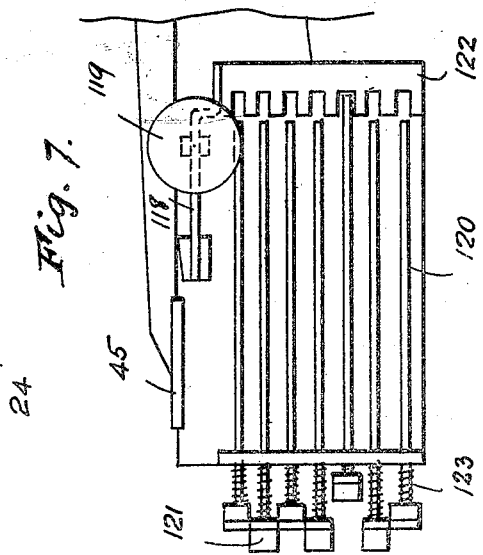

WILLIAM Y. FORBES AND WILLIAM H. ROTHWELL, OF LIVERPOOL, ENGLAND.

TYPE-WRITING MACHINE.

968,042.  Specification of Letters Patent.  Patented Aug. 23, 1910.

Application filed October 31, 1908. Serial No. 460,555.

*To all whom it may concern:*

Be it known that we, WILLIAM YUILE FORBES and WILLIAM HASTINGS ROTHWELL, both subjects of the King of Great Britain and Ireland, residing at "Lynwood," Huyton, Liverpool, England, have invented a new and useful Improvement in Type-Writing Machines, of which the following is a specification.

This invention has reference to type-writing machines, and relates to mechanism for effecting and controlling the to and fro movements of the platen carriage; to mechanism for providing marginal spaces; and to mechanism for producing writings, numerals and the like, in a tabulated form.

In the annexed drawings:—Figure 1 is a plan and Fig. 2 is a side view, showing the general arrangement of a typewriting machine in which the present improvements are embodied. Fig. 3 is an underside plan of the machine. Fig. 4 is an end view of the machine, with the platen carriage removed. Fig. 5 is an underside plan of the platen carriage. Fig. 6 is a side view, partly in section, and Fig. 7 is a part plan, illustrating the tabulating mechanism upon a larger scale. Fig. 8 is a part plan of the front of the machine, illustrating means for affording side play to the rack bar and attendant parts on said front portion.

According to this invention the principal motions of the typewriter are effected by or controlled from the main hand lever 24. The toothed sector 23 rotates the spurwheel 20 and pinion 22, by which the platen carriage 13 is caused to travel to and fro upon its frame 46. Pivoted on this lever 24 are the carriage release lever 45 and the line spacing lever 83, both of these levers being conveniently positioned on the outward end of such hand lever 24, in order that they may be operated simultaneously by one hand in the act of returning the carriage. The release of the carriage 13 from the pinion 29 of the escapement device is effected by tilting the rack 30 out of engagement therewith, by the rising rod 41 and roller 42, a rod or wire 44 connecting the bell-lever 43 to which the rising rod 41 is led, with the carriage release lever 45. Line spacing rotation is imparted to the platen roller by the lever 83 through the cord or wire 84, pull-rod 85, bar 86, and side levers 87, one of such side levers actuating the usual pawl and ratchet employed for rotating the platen roller.

The outward end of the hand lever 24 traverses the arc plate 113 at the front of the machine. On the plate 113 is a scale rack 114, the teeth of which correspond in number with the teeth in the spacing rack 30 and consequently with the spaces on the scale bar 107.

The travel of the hand lever 24 is limited, in order to produce marginal spaces on either side of the paper, by means of the stop markers 115 pivoted on the rod 116. One marker 115 is provided for each group of ten (or other number) of teeth in the rack 114. The bottom and front of the markers 115 are formed with three flats, which are engaged by the flat springs 117, so that any marker may be turned into either of three positions, namely, a vertical position in which they are inoperative, a horizontal position in which they form such marginal stops, and a downward position in which they form stops for a tabulating device hereinafter described.

Arranged to engage the markers 115 when they are in their horizontal position, is a marginal release lever 118 pivoted on the hand lever 24 and provided with a key 119. In its normal position the end of the release lever 118 engages the markers 115, and by depressing the key 119 a release is effected and the hand lever 24 may be shifted past such markers. A tabulating mechanism is also arranged upon the end of such operating hand lever 24, such tabulating mechanism operating in conjunction with the markers 115 above referred to. Such tabulating mechanism — which may be detachably mounted on the lever 24 — comprises a series of horizontally sliding rods 120, which may be seven in number, for numerals expressing millions. The rods 120 bear finger plates 121 on which are marked units, tens, hundreds, et cetera, and such rods operate in conjunction with a receiver bar 122, which bar is capable of a rocking motion and receives the end of either one of the rods 120 when it is pushed forward, the rocking motion of the bar 122 then tilting the end of such rod 120 upward so that it will engage with the markers 115 when the latter are turned into their third or downward position. The bar 122 is caused to rock by the end of the carriage release lever 45 engaging the inclined undersurface of such bar. In operation, by pushing inward one of said rods 120 the end thereof passes on to the receiver bar, and then slightly recedes under the influence of its spring 123. In this forward and backward movement a notch 124 on the rod 120 has taken hold of the pawl 125, which pawl then prevents the rod 120 from receding further. Then by actuating the carriage release lever 45 the receiver bar 122 is rocked and raises the end of the rod 120 so that it will come in contact with a marker 115. When the receiver bar 122 raises the rod 120 the pawl 125 escapes from the tooth 124, leaving the rod 120 free to return to its outward position when the carriage release lever is relinquished.

The arc front plate 113 carrying the rack 114 and markers 115, is arranged to possess a sidewise motion on the base of the machine, under the influence of springs 126, the object of this play being to allow the lever 24 to go past the point where it is required to stop, and then to recede to such point, this small play allowing the escapement pawl 32 to pass its final tooth or pin 31 in a movement. The spring play also serves to obviate undue concussion of the margin release lever 118 and tabulating rods 120 upon the markers 115.

Having now described our invention, what we claim as new and desire to secure by Letters Patent is:—

1. In a typewriting machine, the combination with a hand lever by which traversing movements of the platen carriage may be effected, of a lever for effecting line-spacing movements, a lever for releasing the platen carriage from the escapement mechanism, and a lever for engaging and disengaging marginal stop pieces, all of said three last mentioned levers being pivoted on the outward or hand end of the said hand lever, substantially as described.

2. In a typewriting machine, the combination with a hand lever by which the traversing movements of the platen carriage may be effected, of a tooth arc scale bar traversed by said lever, pivoted stop markers capable of assuming either of three positions on their pivots and engaging in the teeth of said arc scale bar in two of said positions to form limits of travel for said hand lever, a marginal release lever pivoted on said hand lever and adapted to engage and disengage with said marker stops when the latter are placed in their central or horizontal position in the teeth of said arc scale bar, substantially as described.

3. In a typewriting machine, the combination with a hand lever by which traversing movements of the platen carriage may be effected, of a tabulating mechanism comprising a series of sliding key rods mounted on said lever, a rocking bar possessing notches adapted to receive the ends of said key rods when the latter are pushed inwardly, a lever for imparting motion to said rocking bar, a pawl for retaining said key rods in engagement with the rocking bar until the latter has been raised, an arc scale bar traversed by said hand lever, and a series of marker stop pieces adapted to engage in the teeth of said arc scale bar and to engage with the raised ends of said key rods, substantially as described.

W. Y. FORBES.
W. H. ROTHWELL.

Witnesses:
   JAMES A. COUBROUGH,
   WM. BLANCHARD.